United States Patent [19]

Föhl

[11] 4,381,084
[45] Apr. 26, 1983

[54] RE-TIGHTENER WITH PYROTECHNIC PROPELLANT CHARGE FOR SAFETY BELT AUTOMATIC WIND-UP DEVICES

[75] Inventor: Artur Föhl, Schorndorf, Fed. Rep. of Germany

[73] Assignee: REPA Feinstanzwerk GmbH, Fed. Rep. of Germany

[21] Appl. No.: 127,494

[22] Filed: Mar. 5, 1980

Related U.S. Application Data

[63] Continuation of Ser. No. 834,794, Sep. 19, 1977, abandoned.

[51] Int. Cl.³ .................... A62B 35/00; B65H 75/48
[52] U.S. Cl. .......................... 242/107; 242/107.4 R; 60/632
[58] Field of Search .................. 242/107–107.7, 242/55; 244/122 B; 280/801–808; 297/474–480; 180/268; 60/632, 636–638; 227/9, 10

[56] References Cited

U.S. PATENT DOCUMENTS

| | | | |
|---|---|---|---|
| 3,077,324 | 2/1963 | Strickland | 242/107.4 R |
| 3,178,136 | 4/1965 | Bayer | 242/107.4 B X |
| 3,433,014 | 3/1969 | Duport et al. | 60/637 X |
| 3,845,836 | 11/1974 | Bendler et al. | 242/107.4 R X |
| 3,976,257 | 8/1976 | Fohl | 242/107 X |
| 4,142,692 | 3/1979 | Andres | 242/107 |
| 4,144,714 | 3/1979 | Bendler | 60/632 |

*Primary Examiner*—John M. Jillions
*Attorney, Agent, or Firm*—Yount & Tarolli

[57] ABSTRACT

A retightener for safety-belt automatic wind-up devices having an energy converter having a charge, which when activated in the case of danger, the explosive pressure of the fired charge acts on a retightening element which tightens the safety-belt around the body of the motor vehicle passenger. The retightener of the invention has an intermediate liquid medium transmitting the explosive pressure of the charge arranged between the charge and the retightening element.

16 Claims, 4 Drawing Figures

RE-TIGHTENER WITH PYROTECHNIC PROPELLANT CHARGE FOR SAFETY BELT AUTOMATIC WIND-UP DEVICES

This is a continuation of application Ser. No. 834,794 filed Sept. 19, 1977, now abandoned.

BACKGROUND OF THE INVENTION

1. Field of the Invention

The invention relates to a retightener with a pyrotechnical charge for safety-belt automatic wind-up devices having an energy converter, wherein the explosive pressure of the fired charge acts, in the case of danger, on a retightening element which tightens the safety belt around the body of the motor vehicle passenger to be protected.

2. Description of the Prior Art

Retighteners of the type with a pyrotechnic propellant charge serve to eliminate belt looseness, in the case of danger, by pulling back the belt, so that the belt fits the body of the passenger to be protected as closely as possible and the free forward fall up to the point that the belt becomes effective is kept as small as possible.

In one known design of retightener, a piston guided in a tight cylinder with its piston rod engaging the safety belt with its free end, is displaced in the cylinder, in the case of danger, by the explosive pressure of a pyrotechnical charge, and the belt is thereby retightened.

Rotary tighteners which are combined with the automatic wind-up are also known. In such devices the explosive pressure of the pyrotechnic propellant charge drives a turbine wheel which is fastened on the shaft of an automatic wind-up.

The so-called linear tighteners, which work with a piston guided in a cylinder, have the disadvantage that they have only a relatively small retightening travel distance, compared to the relatively large volume they occupy. In order to be effective the linear tighteners must be tightly sealed and this requires a great deal of effort as well as adding materially to the cost.

The effect of the known rotary tighteners in practice was found insufficient to adequately retighten the belt because the pressure of the explosion can be transmitted to the turbine wheel only with low efficiency.

SUMMARY OF THE INVENTION

An object of the invention is to provide a retightener with pyrotechnic propellant for safety-belt automatic wind-up devices with substantially increased efficiency, particularly in the case of rotary retighteners, and with reduced cost of sealing.

With the foregoing and other objects in view, there is provided in accordance with the invention a retightener for safety-belt automatic wind-up devices having a shaft mounted in a bearing block, a safety belt wound around the shaft, a retightening element connected to the shaft, with a pyrotechnic propellant charge which when activated by firing the charge generates an explosive pressure on the retightening element to tighten the safety belt around the body of a motor vehicle passenger to be protected, including a liquid medium intermediate the retightener and the pyrotechnic propellant charge to transmit the explosive pressure of the charge to the retightener.

Other features which are considered as characteristic for the invention are set forth in the appended claims.

Although the invention is illustrated and described herein as embodied in a re-tightener with pyrotechnic propellant charge for safety-belt automatic wind-up devices, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 1 shows a side view of an automatic wind-up device with a built-on liquid container and a turbine wheel; and FIG. 2 is a top view of the automatic wind-up device of FIG. 1 with the liquid container shown in cross section; and FIG. 3 is an automatic wind-up device according to FIG. 1 with a helical tube as the liquid container; and FIG. 4 is an automatic wind-up device according to FIG. 1 with a tube spirally wound around the turbine wheel as the liquid container.

DETAILED DESCRIPTION OF THE INVENTION

Figure 1:
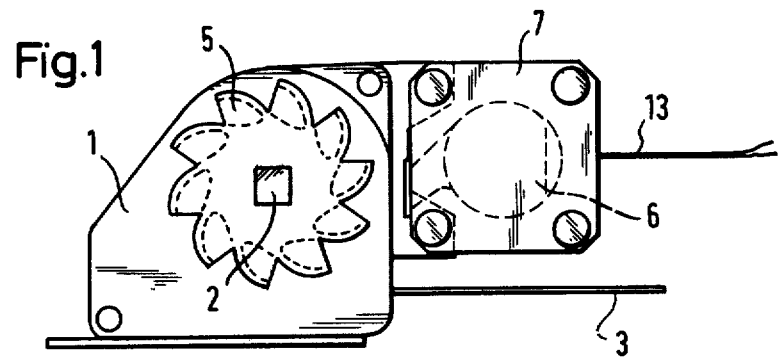

An intermediate liquid medium which transmits the explosive pressure of the charge is arranged between the pyrotechnical charge and the retightening element. The liquid medium may be any suitable liquid which is non corrosive in the container and which desirably has a low freezing point. Liquids commonly used as hydraulic fluids are generally satisfactory. The liquid may be water with an additive to lower the freezing point or may be an organic liquid such as a glycol.

By using an intermediate liquid medium according to the invention, the sealing requirements for a linear tightener are reduced while the efficiency is increased. In a rotary tightener, only the intermediate liquid medium makes a transmission of the explosive pressure of the charge to the turbine wheel possible with sufficiently high efficiency. In retighteners with a turbine wheel as the retightening element, which is preferably mounted directly on the shaft of an automatic wind-up device taking up the safety belt, a container is provided, which receives the liquid intermediate medium and which has in a region opposite the charge at least one blast nozzle which is aligned in the driving direction of the turbine wheel and which is closed off by a rupture disk. This liquid container may advantageously have the form of a cylinder with a propulsion piston arranged between the charge and the intermediate liquid medium. The physical relationship between the intermediate liquid medium and the automatic winder is advantageously chosen so that the cylinder is parallel to the shaft of the automatic wind-up device. The propulsion piston is advantageously fixed in its position by a shearing element and may be provided with a pressure equalization nozzle for reducing the excess explosion pressure.

According to a further embodiment of the invention, the container with the intermediate liquid medium is designed in the shape of a coiled or spirally bent tube, one end of the tube being closed off by the charge and the other end being designed as a blast nozzle. The physical arrangement of the helical tube is advantageously disposed so that the coil is parallel to the shaft of the automatic wind-up device as in the case of the cylindrical container.

If a tube bent in the shape of a helix is used, it is advantageous to arrange the latter concentrically about the turbine wheel. In most cases it is preferable to combine the container containing the intermediate liquid medium with the automatic winder or wind-up device to form a unitary structural unit.

Examples of rotary retighteners in accordance with the invention are shown in the drawings.

In an automatic wind-up device of conventional design shown in FIGS. 1 to 4, a turbine wheel 5 is firmly mounted on a free end 2 of the shaft 4 on which the safety belt 3 is wound and unwound. The other end of the shaft 14 is connected to a retractor spring which continuously biases the shaft in a direction for retracting (winding up) the belt.

Figure 2:
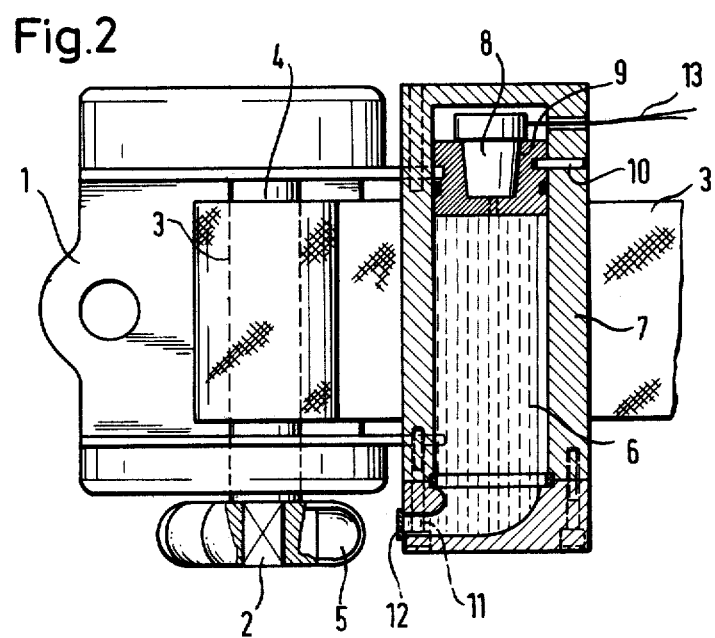

In FIGS. 1 and 2, a container 7 which contains an intermediate liquid medium and has the form of a hollow cylinder, is combined with the automatic wind-up device 1 in a structural unit. A pyrotechnic propellant charge 8 is arranged at one end of the cylinder. Between the charge 8 and the intermediate liquid medium 6 a propulsion cylinder 9 is secured in its rest position by a shearing element 10 which will yield on activation of the charge. The end opposite the charge is designed as a blast nozzle 11, which is closed off by a rupture disk 12 and is aligned in the driving direction of the turbine wheel.

When the charge 8 is ignited via the ignition cable 13, the shearing element 10 is destroyed and the propulsion piston 9 is pushed against the intermediate liquid medium 6. This pressure destroys the rupture disk 12 and the intermediate liquid medium 6 is ejected as a directed jet under high pressure in the drive direction against the turbine wheel 5, which is thereby set in rotation, rewinding the belt 3 on the shaft 4, taking up the slack of the belt.

This arrangement is particularly advantageous if the automatic wind-up device comprises an energy converter, as in that case, the desired energy conversion for relieving the load on the protected person takes place immediately.

Figure 3:
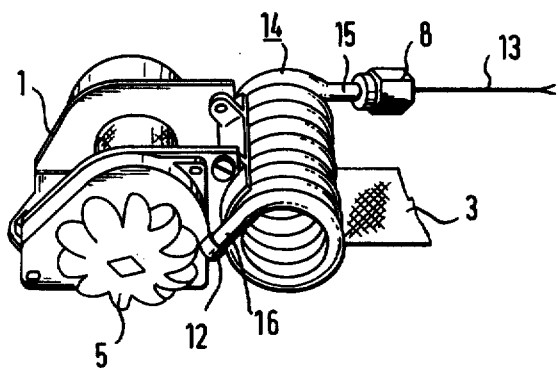

In the example according to FIG. 3, the liquid container is designed in the form of a helical tube 14, the physical arrangement of which is similar to that of the container 7 in FIG. 2. The charge 8 with the ignition cable 13 is arranged at one end 15 of the tube 14, while the other tube end 16 is designed as a blast nozzle with a rupture disk 12. The propulsion piston is unnecessary in this embodiment.

Figure 4:
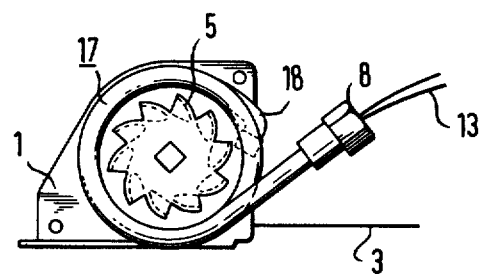

In the embodiment according to FIG. 4, a tube containing the intermediate liquid medium is bent into a spiral 17, which surrounds the turbine wheel 5 concentrically. The charge 8 with the ignition cable 13 is again arranged, similarly to the embodiment according to FIG. 3, at one end of the tube and the other end 18 is designed as a blast nozzle.

The operation of the embodiments shown in FIGS. 3 and 4 is the same as the operation of the embodiment example according to FIGS. 1 and 2.

The embodiments of the invention in which an exclusive property or privilege is claimed are defined as follows:

1. In a safety belt retractor system in which a shaft is mounted in a bearing block, a safety belt is wound about the shaft, a re-tightening element is connected to the shaft, and a pyrotechnic propellant charge is provided which when activated by firing the charge generates an explosive pressure on the re-tightening element to tighten the safety belt around the body of a motor vehicle passenger to be protected, the improvement comprising a liquid medium and a propulsion piston disposed intermediate the re-tightening element and the pyrotechnic propellant charge with the propulsion pistos disposed between the liquid medium and the pyrotechnic propellant charge so that the explosive pressure of the charge is applied against the piston and drives the liquid medium against the re-tightening element to tighten the safety belt around the body of the motor vehicle passenger.

2. Retightener according to claim 1, wherein the retightening element is a turbine wheel and wherein the intermediate liquid medium is contained in a container which has at least one blast nozzle aligned in the driving direction of the turbine wheel in a region opposite the pyrotechnical charge.

3. Retightener according to claim 2, wherein the blast nozzle is closed off by a rupture disk.

4. Retightener according to claim 2, wherein the container containing the intermediate liquid medium has the shape of a cylinder.

5. Retightener according to claim 4, wherein the cylinder containing the intermediate liquid medium has its axis parallel to said shaft, and wherein said turbine wheel is connected to one end of said shaft.

6. Retightener according to claim 4, wherein the propulsion piston is secured in its rest position by a shearing element.

7. Retightener according to claim 2, wherein the container containing the intermediate liquid medium has an opening closed off by the charge.

8. Retightener according to claim 2, wherein the container containing the intermediate liquid medium has the form of a helical or spirally bent tube.

9. A safety device for a vehicle for restraining an occupant of a vehicle during a collision, said safety device comprising a belt winding device including support means for attachment to a vehicle, a rotatable member carried by said support means, a safety belt for restraining an occupant during a collision, said safety belt being attached to said rotatable member and wound thereon upon rotation of said rotatable member in one direction, means for tightening said safety belt around the occupant in response to a collision, said means comprising a retightening element connected with said rotatable member to rotate said rotatable member in said one direction upon rotation of said retightening element in said one direction, a pyrotechnic propellant charge for generating an explosive pressure in response to a collision, a liquid container for connection with the vehicle and disposed intermediate said retightening element and said pyrotechnic propellant charge, said container having a liquid medium disposed therein, a propulsion piston disposed between said liquid medium and said pyrotechnic propellant charge and an outlet disposed for directing the liquid medium from the container against the retightening element for driving said retightening element in said one direction, said propulsion piston being disposed to receive the explosive pressure of said pyrotechnical propellant charge and transmit the explosive pressure to said liquid medium to force said liquid medium to exit from said container through said outlet and act on said retightening element to drive said retightening element in said one direction for tightening the safety belt around the occupant.

10. Safety device for a vehicle according to claim 9, wherein the retightening element is a turbine wheel and the container includes at least one blast nozzle aligned in the driving direction of the turbine wheel in a region opposite the pyrotechnic charge.

11. Safety device for a vehicle according to claim 10, wherein the blast nozzle is closed off by a rupture disc.

12. Safety device for a vehicle according to claim 10, wherein the container containing the intermediate liquid medium has an opening closed off by the charge.

13. Safety device for a vehicle according to claim 10, wherein the container containing the intermediate liquid medium has the form of a helical or spirally bent tube.

14. Safety device for a vehicle according to claim 10, wherein the container containing the intermediate liquid medium has the shape of a cylinder.

15. Safety device for a vehicle according to claim 14, wherein said rotatable member is a shaft which is connected at one end to the turbine wheel and the cylinder containing the intermediate liquid medium has its axis parallel to said shaft.

16. Safety device for a vehicle according to claim 14, wherein the propulsion piston is secured in its rest position by a shearing element.

* * * * *